US005376050A

United States Patent [19]

Krude et al.

[11] Patent Number: 5,376,050

[45] Date of Patent: Dec. 27, 1994

[54] TRIPOD JOINT

[75] Inventors: Werner Krude, Neunkirchen-Wolperath; Dieter Jost, Troisdorf, both of Germany

[73] Assignee: GKN Automotive AG, Siegburg

[21] Appl. No.: 87,960

[22] Filed: Jul. 6, 1993

Related U.S. Application Data

[63] Continuation of Ser. No. 805,996, Dec. 9, 1991, abandoned.

[30] Foreign Application Priority Data

Dec. 12, 1990 [DE] Germany ............................ 4039597

[51] Int. Cl.$^5$ .............................................. F16D 3/205
[52] U.S. Cl. ..................................... 464/111; 464/905
[58] Field of Search ................ 464/111, 905, 170, 178

[56] References Cited

U.S. PATENT DOCUMENTS

| | | | |
|---|---|---|---|
| 3,792,596 | 2/1974 | Orain | 464/111 |
| 4,242,888 | 1/1981 | Komeiji et al. | 464/905 X |
| 4,507,100 | 3/1985 | Doré et al. | 464/111 |

FOREIGN PATENT DOCUMENTS

| | | | |
|---|---|---|---|
| 0034073 | 1/1981 | European Pat. Off. . | |
| 0061368 | 2/1982 | European Pat. Off. . | |
| 2629157 | 3/1988 | France . | |
| 2235115 | 7/1972 | Germany . | |
| 3108312 | 9/1982 | Germany . | |
| 3546458 | 10/1986 | Germany . | |
| 3812448 | 6/1989 | Germany . | |
| 1454693 | 11/1976 | United Kingdom | 464/111 |

*Primary Examiner*—Daniel P. Stodola
*Assistant Examiner*—Eileen A. Donn
*Attorney, Agent, or Firm*—Harness, Dickey & Pierce

[57] ABSTRACT

A tripod joint has an outer joint part with an annular housing (1) and roller track elements forming roller tracks, and an inner joint part with a tripod member (6) including rollers (5). The rollers (5) are guided on roller tracks (4) in the roller track elements (2). The roller track elements (2) include longitudinal edges (3) facing an inner face (10) of the tripod housing (1). At the end faces of their longitudinal edges (3), the roller track elements (2) are non-releasably connected to the annular housing (1). The substantially cylindrical tripod housing (1), at one end face, has a housing aperture whereas at the opposite end, it is connected to a shaft journal.

6 Claims, 6 Drawing Sheets

17
19
18
20
1
10
2
6
5
4
3
12
11

TRIPOD JOINT

This is a continuation of U.S. patent application Ser. No. 805,996, filed Dec. 9, 1991, now abandoned.

BACKGROUND AND SUMMARY OF THE INVENTION

The invention relates to a tripod joint and, more particularly, to a tripod joint with an outer joint part having an annular housing and roller track elements made of plate metal. The tripod inner joint part has a tripod member provided with rollers guided in roller tracks formed by the roller track elements.

Tripod joints like that disclosed in DE 38 34 441 A1 are used in driveshafts of front wheel drive vehicles. These relevant art tripod joints have relatively high mass and require relatively complicated production processes. To provide a tripod joint with damping properties, FR 2 629 157 A1 proposes an outer joint part with an annular housing which is made of a fiber composite material. Roller track elements are molded into the annular housing by using a plastic filler material. It is not proposed to provide a firm connection between the annular housing with the roller track elements and the joint journal which is capable of withstanding high torque loads. The plastic filler material is sensitive to high temperatures. This design requires relatively complicated production processes, especially long production times and production sequences which are difficult to automate.

It is the object of the present invention to provide a reduced weight tripod joint whose functional safety is secure and which can be produced easily and cost-effectively. The objective is achieved by directly non-releasably connecting the longitudinal edges of the roller track elements with the annular housing.

Thus, it is possible to provide a tripod joint whose annular housing and roller track elements are designed as formed plate metal parts. These parts are fabricated by relatively simple production methods and can be connected to each other in a material-locking way. In the case of plunging joints, the roller track elements are designed as profiles with identical cross sections. In the case of a fixed joint, the roller track elements are produced with indentations for curved roller tracks. In a practical embodiment of the invention, the roller track elements are welded to the annular housing. Preferably, the roller track elements are connected to the tripod housing by laser welding.

To connect such a rotary joint to a shaft journal it is proposed that the annular housing, at the end positioned opposite the housing aperture, includes a radially inwardly decreasing cone. The cone should be connected to the shaft journal via a non-releasable connection via a conical cone receiving means. According to a further embodiment, the tripod housing is provided via a cylindrical housing connection. In this case, the shaft journal, with a cylindrical projection, is held in the housing in a non-releasable connection.

From the following detailed description taken in conjunction with the accompanying drawings and subjoined claims, other objects and advantages of the present invention will become apparent to those skilled in the art.

DETAILED DESCRIPTION THE PREFERRED EMBODIMENT

Figure 1:
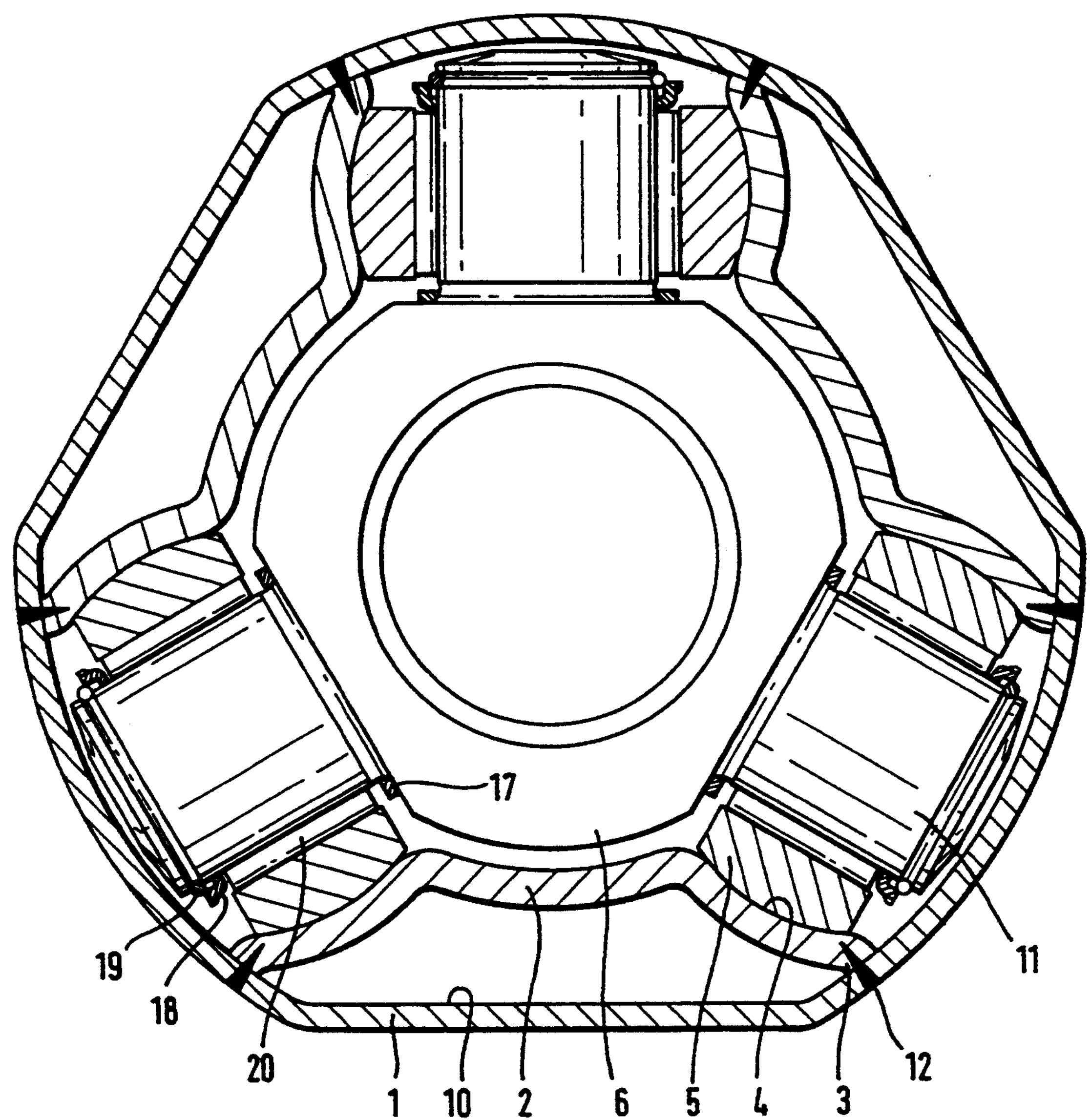
FIG. 1 is a transverse cross section view through a tripod plunging joint in accordance with the present invention.

The annular housing 1 and roller track elements 2 illustrated in FIG. 1 are formed plate metal parts. The roller track elements 2 are inserted into the housing 1 and are each offset by 120°. The roller track element longitudinal edges 3 are non-releasably connected to the inner face 10 of the annular housing 1. A non-releasable connection 12 is shown in the form of a laser weld. The weld penetrates the annular housing 1 from the outside and enters into the end faces of the longitudinal edges 3 to secure the roller track elements 2 with the housing 1.

In the region of the edges 3, the roller track elements 2 include roller tracks 4, with tripod rollers 5 guided on the roller tracks 4 of each adjoining roller track elements 2 as seen in FIG. 1. The tripod rollers 5 run on tripod arms 11 of a tripod member 6. In the embodiments illustrated, the tripod rollers 5 are supported on the tripod arms 11 via needle bearings 20. The rollers 5 are held by stop discs 17 relative to the radially inner tripod member 6. Towards the radial outside, the tripod rollers 5 are held by spacing discs 18 which, in turn, are secured by securing rings 19. The tripod rollers 5 are designed to have predetermined radial movement.

Figure 2:
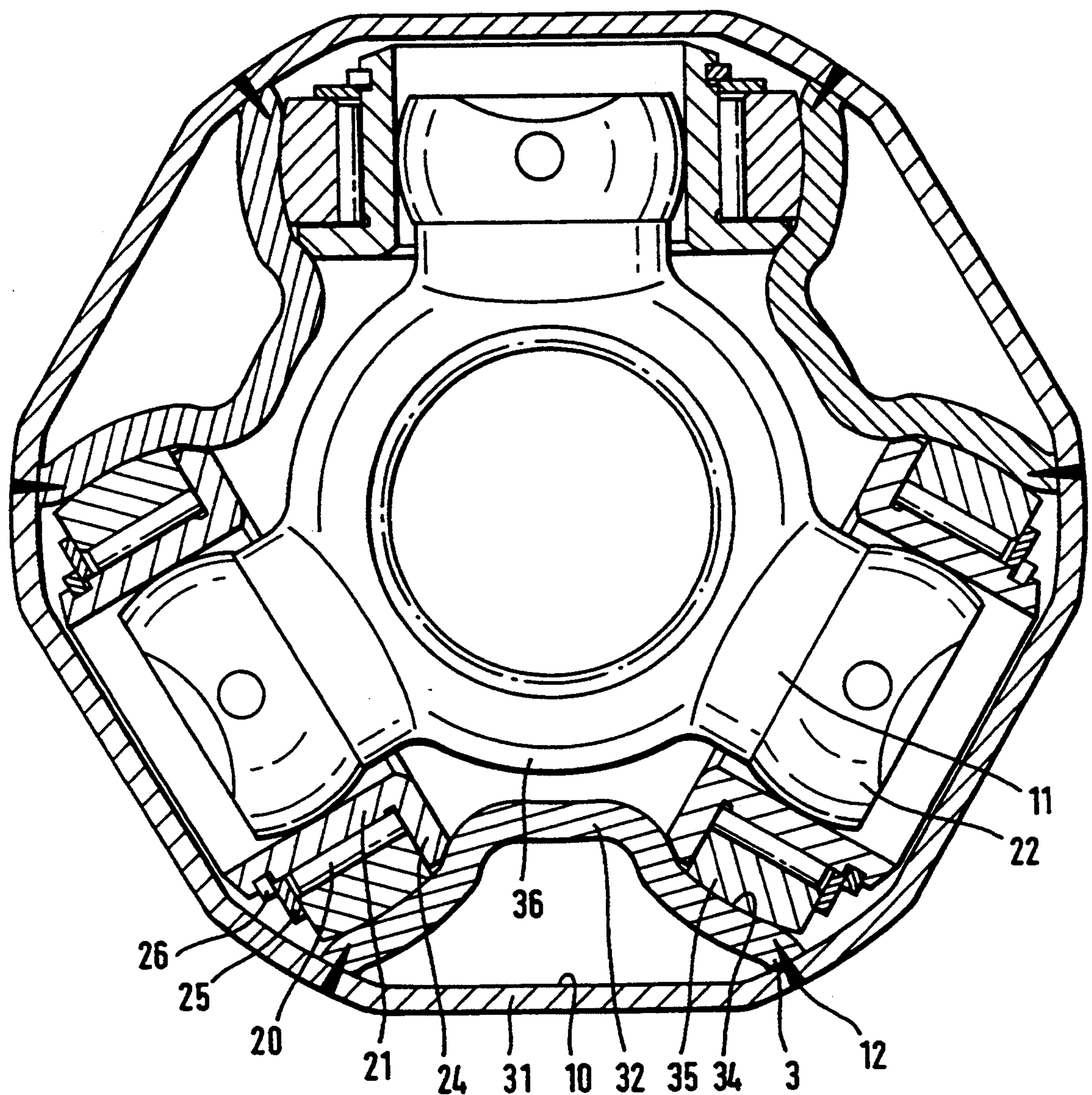
FIG. 2 is a transverse cross section view through a tripod plunging joint like that of FIG. 1, having spherical tripod arms guiding roller carriers.

In the case of the embodiment to FIG. 2, the roller track elements 32, in the region of their longitudinal edges 3, are connected to the inner face 10 of the annular housing 1 via welds 12. In the case of this design, the tripod member 36 includes integrally formed-on, spherical arms 22 movably supporting roller carriers 21. The roller carriers hold needle bearings 20 with the tripod rollers 35 running thereon. The needles 20 are held on roller carriers between shoulders 24 and discs 25, while the discs are held by securing rings 26 simultaneously securing the rollers.

Figure 3:
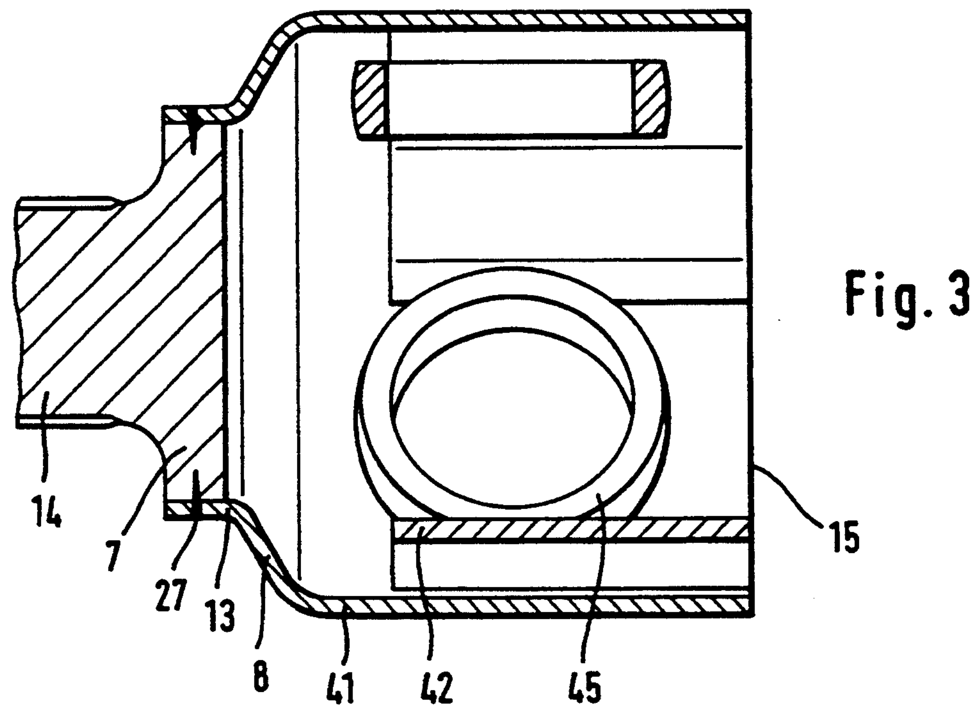
FIG. 3 is a longitudinal sectional view through a plunging joint according to FIGS. 1 and 2, with a cylindrical housing connection which is welded to a cylindrical portion of the shaft connection of a journal shaft.

As illustrated in FIG. 3, such tripod outer parts are connected to a shaft journal 14. Opposite the housing aperture 15, the shaft journal 14 includes an increased outer diameter cylindrical shaft connection 7. The annular housing 41 includes a radially inwardly pointing cone 8 which runs out into a cylindrical housing connection 13 to connect the housing 1 with the shaft connection 7.

The housing connection 13 comprises an internal diameter which substantially corresponds to the outer diameter of the shaft connection 7. The shaft connection 7 is inserted into the housing connection 13 and connected in a material-locking way, via a non-releasable weld connection 27, such as by laser welding. The shaft connection 7 and housing connection 13 may have a circular-cylindrical cross section, however, their cross section may also be polygonal similar to that of the annular housing 1 of FIG. 1.

Figure 4:
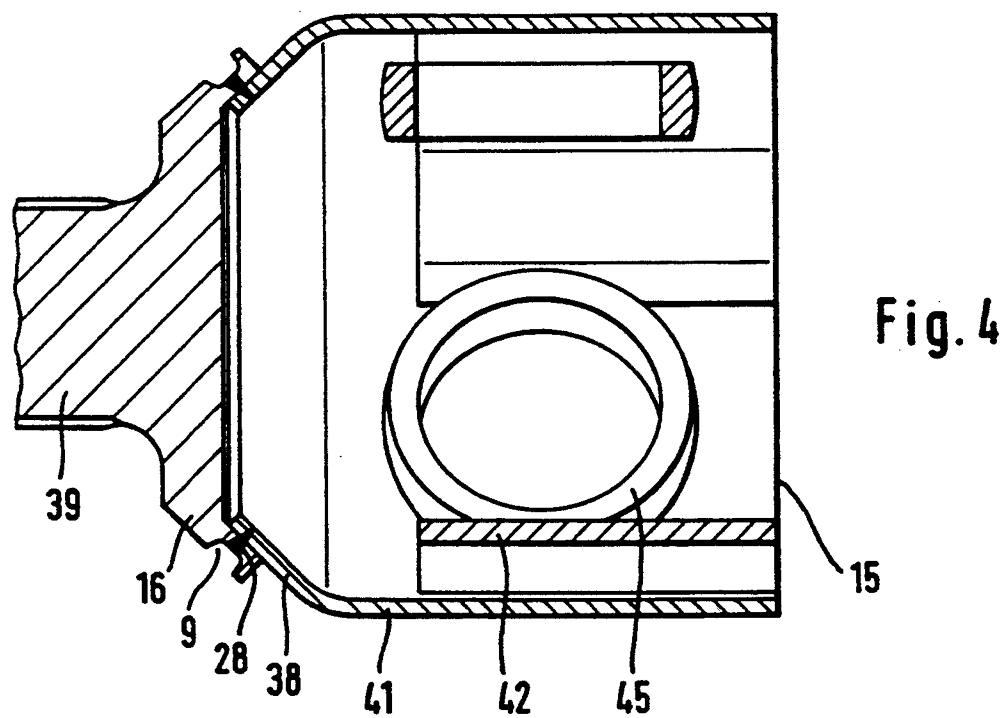
FIG. 4 is a longitudinal section through a plunging joint like FIG. 3 with a connecting cone which is welded to the conical receiving means of the shaft connection of a shaft journal.

In the case of a further embodiment as illustrated in FIG. 4, the shaft journal 39 is provided with conical receiving means 16 accommodating a cone 38 positioned opposite the housing aperture 15 of the tripod outer part. The inner diameter of the conical receiving means 16, while forming a form-fitting connection, corresponds to the outer diameter of the cone 38. In this embodiment, the radially outer cone receiving means 16 is connected to the radially inner annular housing 41, via a non-releasable weld connection 28. To simplify the weld 28, the conical receiving means 16 is provided with an annular groove 9 in the region of the weld 28.

Figure 5:
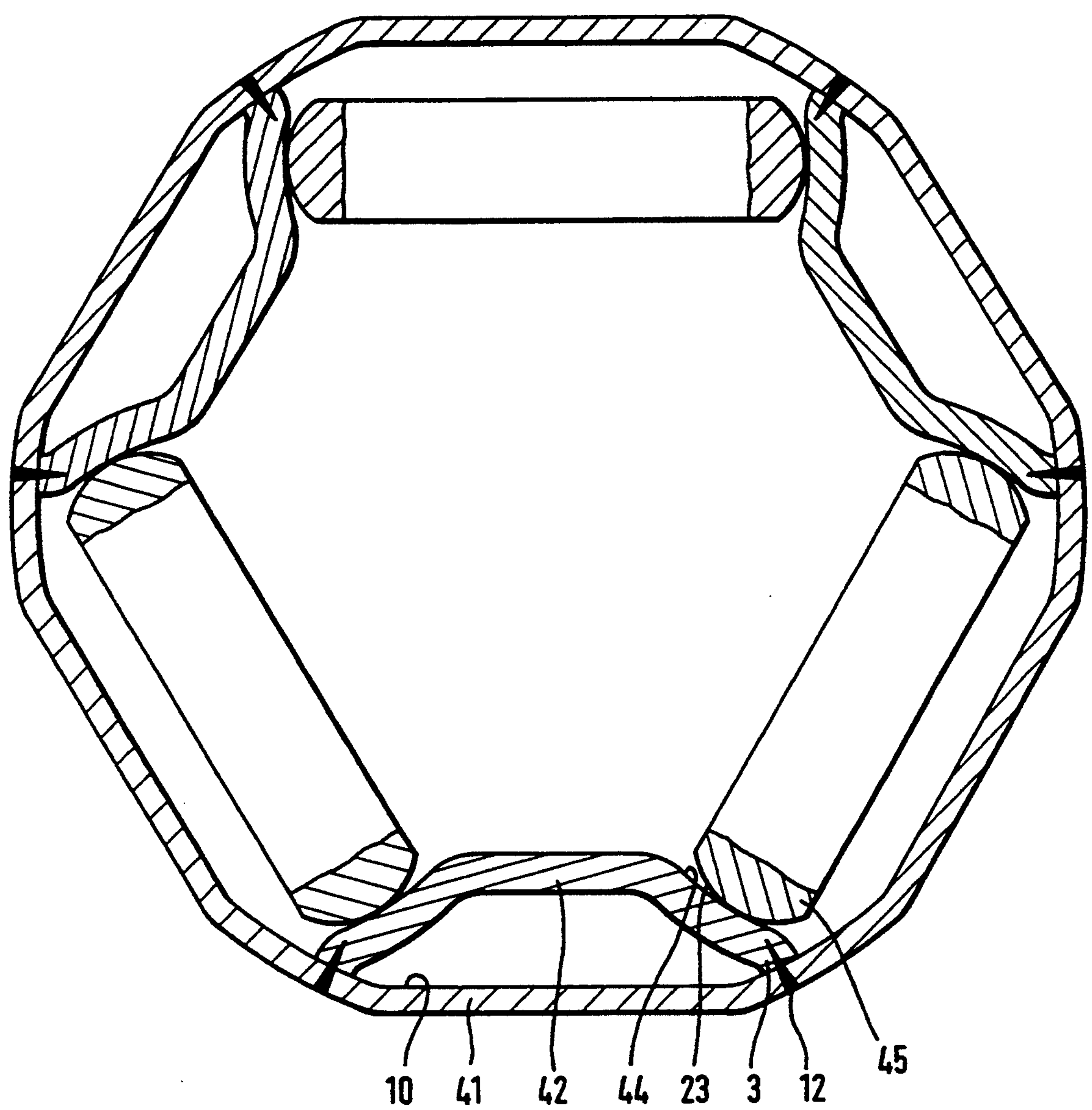
FIG. 5 is a transverse cross section view like that of FIG. 1, with rollers having spherical roller surfaces guided in roller track elements with concavely curved surface roller tracks.

In the case of the embodiment to FIG. 5, the annular housing 41 and the roller track elements 42 are again plate metal parts. Via the end faces of their longitudinal edges 3, the roller track elements 42 are non-releasably connected by welding to the inner face 10 of the tripod housing 41. The roller tracks 44 of the roller track elements 42 have a concave curvature surface, whereas the roller faces 23 of the tripod rollers 45 are spherical.

Figure 6:
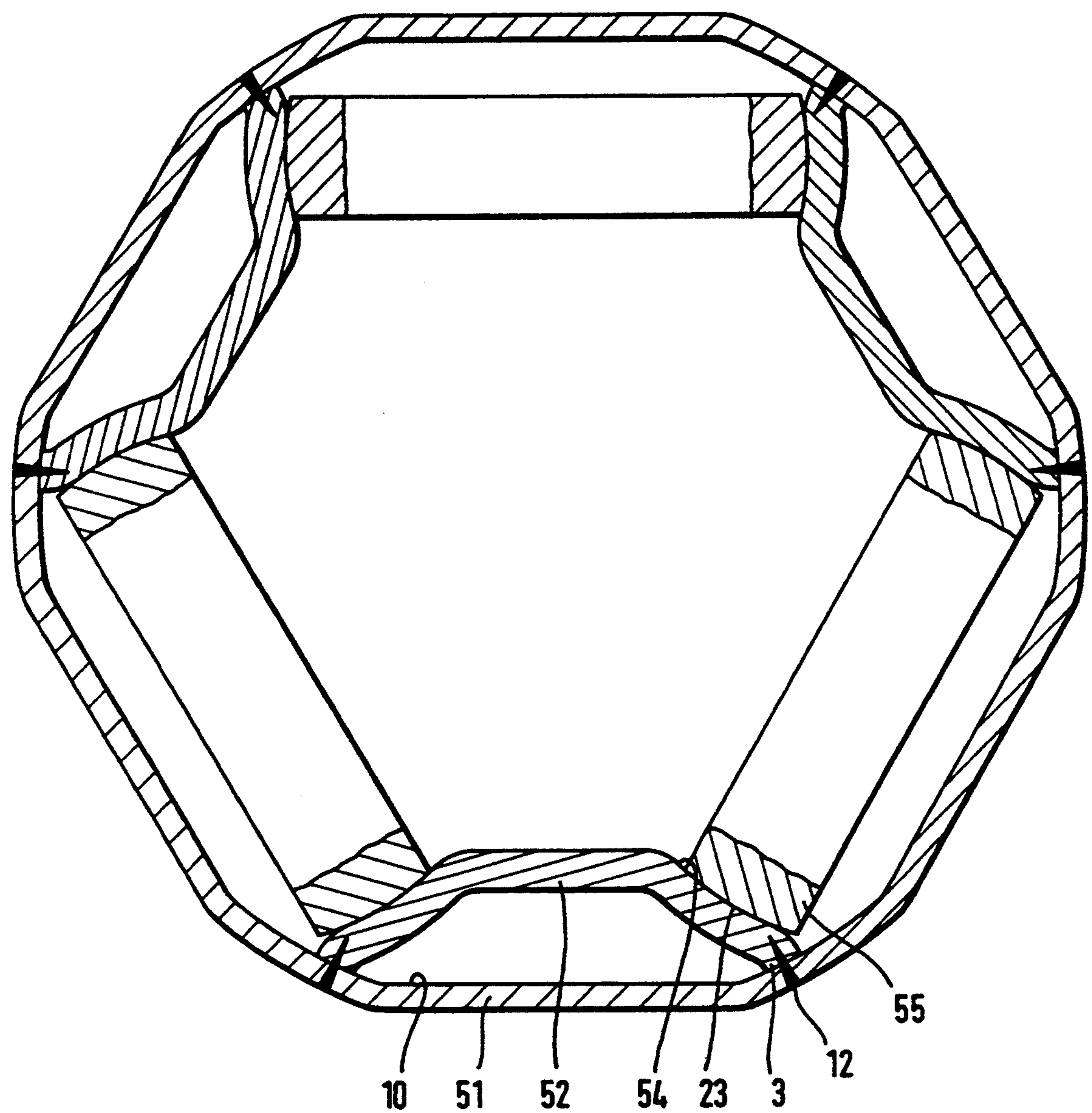
FIG. 6 is a transverse cross section view like that of FIG. 1, with rollers having spherical roller surfaces which are guided in roller track elements with cylindrical surface roller tracks.

The embodiment as shown in FIG. 6 again consists of a plate metal annular housing 51 having plate metal roller track elements 52. The roller track elements 52 include cylindrical surface roller tracks 54 holding spherical tripod rollers 55 in a true-to-angle way.

Figure 7:
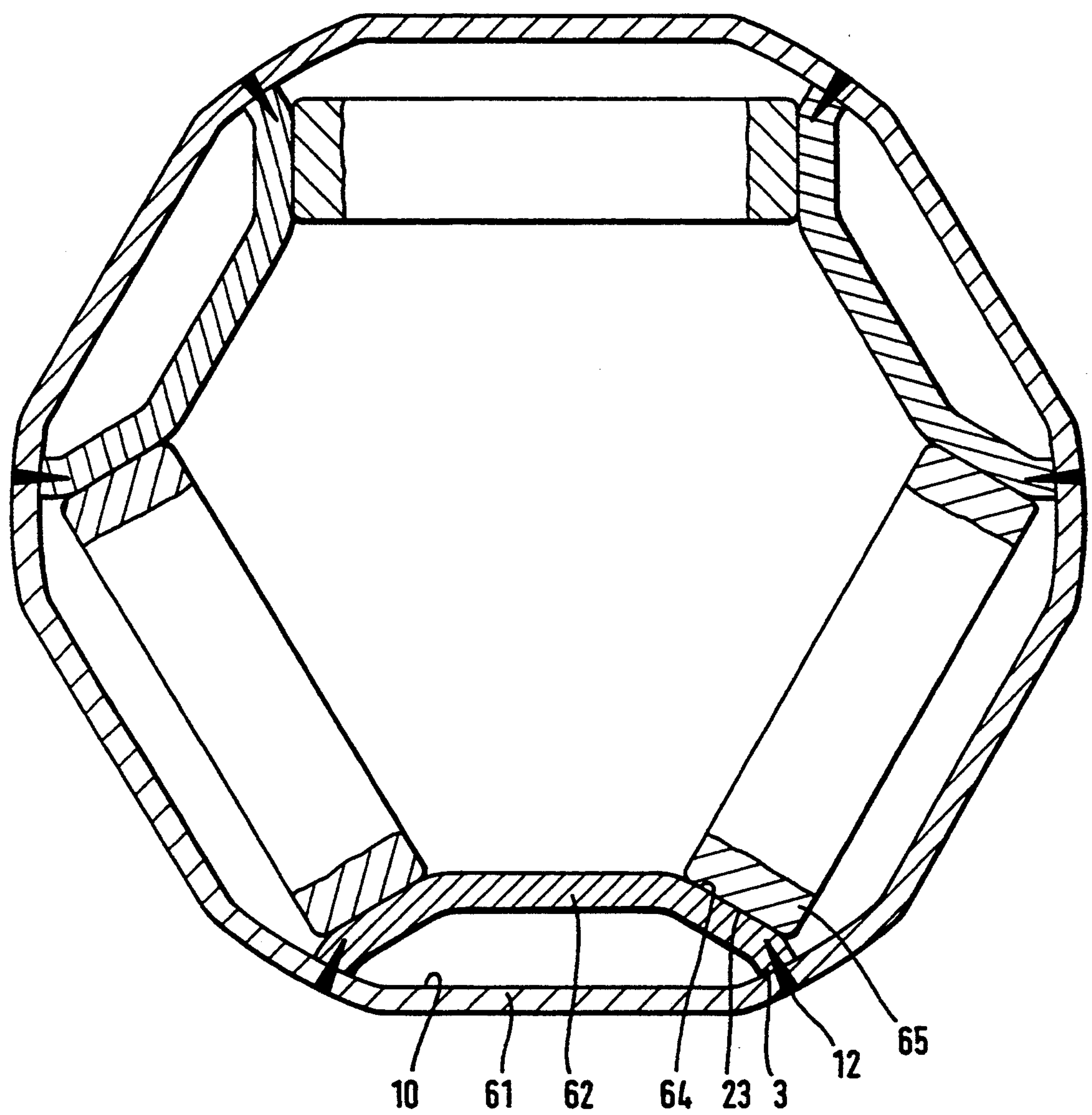
FIG. 7 is a transverse cross section view like that of FIG. 1, with rollers having cylindrical roller surfaces which are guided in roller track elements with planar surface roller tracks.

In the case of the embodiment to FIG. 7, roller track elements 62 designed as formed plate metal parts are connected via laser welds 12 to the inner surface 10 of a plate metal annular housing 61. The roller track elements 62 have planar surface roller tracks 64, with cylindrical tripod rollers 65 guided thereon.

While the above detailed description describes the preferred embodiment of the present invention, the invention is susceptible to modification, variation, and alteration without deviating from the scope and fair meaning of the subjoined claims.

We claim:

1. A tripod joint comprising:

an outer joint part having an annular housing with two ends and three elongated roller track elements both made of plate metal having a similar thickness, said roller track elements provided with longitudinal edges contacting an inner face of the annular housing, welds extending from an outer face of said annular housing through said housing into the longitudinal edges of said roller track elements such that the welds extend substantially along the entire longitudinal length of the track longitudinal edges, said roller track elements, via said welds in their longitudinal edges, being directly non-releasably and fixedly connected with said annular housing, two of said roller track elements forming a pair of roller tracks respectively, and each of said roller track elements comprising two symmetrical roller tracks of adjoining pairs of roller tracks for receiving adjoining rollers, respectively, said annular housing, at one end having a housing aperture and a driving journal connected with the other end of the annular housing; and an inner joint part including a tripod member having arms provided with said rollers, said rollers guided in the roller tracks.

2. A tripod joint according to claim 1, wherein said roller track elements are laser welded to the annular housing.

3. A tripod joint according to claim 1, wherein said annular housing, on said other end, includes a radially inwardly decreasing cone which, via a non-releasable connection, is connected to a cone receiving means at the shaft connection of the driveshaft.

4. A tripod joint according to claim 3, wherein said shaft connection is laser welded to said housing.

5. A tripod joint according to claim 1, wherein said annular housing, on said other end, is provided with a connecting cylinder which, via a non-releasable connection, is held on a cylindrical shaft connection at the driveshaft.

6. A tripod joint according to claim 5, wherein said cylindrical shaft is laser welded to said annular housing.

* * * * *